(12) United States Patent
Friedlander

(10) Patent No.: US 6,859,211 B2
(45) Date of Patent: Feb. 22, 2005

(54) SYSTEM AND METHOD FOR GENERATING AN ONLINE INTERACTIVE STORY

(76) Inventor: Terry H. Friedlander, 654 Fullerton Ave., Seattle, WA (US) 98122

( * ) Notice: Subject to any disclaimer, the term of this patent is extended or adjusted under 35 U.S.C. 154(b) by 549 days.

(21) Appl. No.: 09/951,123

(22) Filed: Sep. 13, 2001

(65) Prior Publication Data

US 2003/0048308 A1 Mar. 13, 2003

(51) Int. Cl.[7] .......................... G09G 5/00; G09B 19/00
(52) U.S. Cl. ...................... 345/700; 345/760; 434/156
(58) Field of Search ................... 345/700, 709, 345/712, 764, 961, 970.1, 733, 744, 748, 760; 434/156, 162, 165, 167, 169; 715/501.1, 513

(56) References Cited

U.S. PATENT DOCUMENTS

| | | | | |
|---|---|---|---|---|
| 5,100,154 A | * | 3/1992 | Mullins | 273/429 |
| 5,306,155 A | * | 4/1994 | Koke | 434/410 |
| 5,551,878 A | * | 9/1996 | Ellenbogen | 434/165 |
| 5,657,992 A | * | 8/1997 | Bellizzi | 273/273 |
| 5,660,548 A | * | 8/1997 | Ellenbogen | 434/167 |
| 5,977,979 A | * | 11/1999 | Clough et al. | 345/422 |
| 5,987,302 A | * | 11/1999 | Driscoll et al. | 434/353 |
| 6,009,397 A | * | 12/1999 | Siegel | 704/270 |
| 6,022,222 A | * | 2/2000 | Guinan | 434/169 |
| 6,148,286 A | * | 11/2000 | Siegel | 704/270 |
| 6,149,441 A | * | 11/2000 | Pellegrino et al. | 434/350 |
| 6,305,942 B1 | * | 10/2001 | Block et al. | 434/156 |
| 6,341,958 B1 | * | 1/2002 | Zilberman | 434/157 |
| 6,442,523 B1 | * | 8/2002 | Siegel | 704/270 |
| 6,632,094 B1 | * | 10/2003 | Falcon et al. | 434/178 |
| 6,638,171 B1 | * | 10/2003 | Igarashi et al. | 463/43 |
| 2002/0124048 A1 | * | 9/2002 | Zhou | 709/203 |

* cited by examiner

Primary Examiner—Sy D. Luu
(74) Attorney, Agent, or Firm—Grimes & Battersby, LLP

(57) ABSTRACT

A system and method for generating an interactive story is provided comprising a system that prompts an individual with a image or photograph and provides a set of active and descriptive words relating to the picture, as well as a set of predetermined, commonly-used parts of speech and phrases, including articles, verbs, prepositions, and conjunctives. The user is instructed to write an essay, short story, letter or poem online employing only said given set of active and descriptive words relating to the common picture. The completed textual work may then be submitted to a contest or posted for others to read and critique.

14 Claims, 8 Drawing Sheets

FIG. 3

**Every Picture Tells a Story
Administrative Login**

To begin the session, enter your user name and password and click on the "login" button.

Username:
Password:

[login]

FIG. 4

**Every Picture Tells a Story
Contest Parameters**

Use this screen to set the contest parameters for Every Picture Tells A Story, then click on the "save parameters" button.

Contest Frequency: [Select Frequency]
Contest Start Date: [_____] (mmddyy)
Contest Start Time: [_____] (hh:mm ss)
Number of entries per e-mail address: [Select Number]
E-mail response upon receipt of entry: ☐ yes ☐ no
Response Text:
```
Your entry has been received! The contest
ends tomorrow at 12:59:59. Visit
http:www.everypicture.com/winners.html to
view the winners. Good Luck!
```
Time to update winner page: [_____] (hh mm ss)

[save parameters]

Every Picture Tells a Story
Entry Report

Entry Report for contest ending 08/28/2001.

| entry time: | e-mail address of submitter: | nickname of submitter: | notes: | actions: |
|---|---|---|---|---|
| 064421 | sojabchase@aol.com | scotbeo | tagged as finalist | view entry / delete entry |
| 052555 | ben@iconologic.com | red | | view entry / delete entry |
| 211844 | cheryl@home.com | brownie | | view entry / delete entry |
| 123457 | betsy@mindspring.com | betsyeble | tagged as finalist | view entry / delete entry | sort report: [sort by...] Sort

FIG. 8

Every Picture Tells a Story
Files Maintenance

Use this screen to maintain the contents of the web site. Click on the "update" button when you have entered all the information required for files maintenance.

○ Remove contests from: _____ (mmddyy) -to- _____ (mmddyy)

-or-

○ Archive contests from: _____ (mmddyy) -to- _____ (mmddyy)

Archive these contests to: _____ Browse...

---

○ Remove entries from: _____ (mmddyy) -to- _____ (mmddyy)

-or-

○ Archive entries from: _____ (mmddyy) -to- _____ (mmddyy)

Archive these entries to: _____ Browse...

---

○ Archive and remove entries and contests from: _____ (mmddyy) -to- _____ (mmddyy)

Archive these entries and contests to: _____ Browse...

update

FIG. 10

SYSTEM AND METHOD FOR GENERATING AN ONLINE INTERACTIVE STORY

BACKGROUND OF THE INVENTION

1. Field of the Invention

The present invention relates generally to a system and method for generating an online interactive story and, more particularly, to a such a system and method that allows individuals to write an essay, short story, letter or poem online employing a given set of active and descriptive words relating to a common picture. A user that accesses the website featuring the system is directed to a web page featuring a image or photograph, together with a set of active and descriptive words relating to the picture, as well as a set of pre-determined, commonly-used parts of speech and phrases, i.e., articles, verbs, prepositions, conjunctives, etc. The individual may then create a story, poem, letter or essay using only these words and phrases. The completed textual work may then be submitted to a contest or posted for others to read on the website.

2. Description of the Prior Art

Various systems and devices designed as learning aids or incentives to encourage and promote language skills and creative writing have long been known. Such systems and devices typically take the form of books and the like, games, and electronic or computerized systems. Each system and device typically attempts to teach or promote writing skills by making such skills easier or more enjoyable to master.

The most basic of these systems and devices are those that come in book form or, alternatively, as stationery for writing letters. For example, U.S. Pat. No. 5,551,878, which issued to Ellenbogen on Sep. 3, 1996 for "Article for Improving Correspondence Letter Writing Skills" and U.S. Pat. No. 5,660,548, which issued to Ellenbogen on Aug. 26, 1997 for a "Method for Improving Letter Composing and Writing Skills" discloses a method to improve letter writing skills through the use of an associative letter writing template in the form of a template having distinct regions, one of which has an outline of a letter while another has a plurality of thematic markings, including words grouped by sub-topic and/or illustrations relating to a common theme. An individual refers to the thematic markings in composing and writing the text of the letter.

U.S. Pat. No. 5,306,155, which issued to Koke on Apr. 26, 1994 discloses a "Creative Writing Book" to teach and encourage writing skills, which book includes a picture printed on each leaf of a tear-off pad with space provided for a learner to generating writing to form a story which the learner imagines from viewing the picture. Similarly, U.S. Pat. No. 4,943,088, which issued to Wada on Jul. 24, 1990 for a "Picture Book With a Pen Containing Water-Soluble Ink" discloses a picture book including a resinous coating upon which a child can paint or write by means of a pen containing water-soluble ink so as to add his or her imaginary expressions to the story.

Games are often particularly effective tools to encourage creative writing, since the individual is often unaware that she is honing her writing skills. An example of a writing game is disclosed in U.S. Pat. No. 5,100,154, which issued to Mullins on Mar. 31, 1992 for a "Timed Group-Writing Game With Random Characterizations." Mullins teaches the use of a time limited game for a group of players to share in the composition of several short stories, including the means to achieve this composition. Said means include character profile cards and a spinner to determine the genre or category of the composition. Another entertaining creative writing tool is disclosed in U.S. Pat. No. 5,657,992, which issued to Bellizzi on Aug. 19, 1997 for "Entertainment Device, and Method for Developing Acting, Thinking, Writing and Public Speaking Ability." The system in Bellizzi requires a director to distribute playing cards and scenario cards from to all the players, who attempt to creatively and amusingly play their cards to produce a story line. The game is designed to both entertain and educate players with current art, literature, drama, comedy, films and celebrities.

Recently, a number of electronic and computerized tools for assisting and encouraging individuals in developing their creative writing and language skills have become more and more common. For example, U.S. Pat. No. 5,987,302, which issued to Driscoll et al. for "On-Line Essay Evaluation System" discloses a system and method for evaluating students essays on-line. The system provides the capability for a user to submit essays at any time and to receive consistent evaluations thereof, which evaluations are designed to provide instructional feedback to the students about their skills relative to any assessment or test that the student wishes to take. Another example of an educational language tool is disclosed in U.S. Pat. No. 6,149,441, which issued to Pellegrino et al. for a "Computer-Based Educational System." The system includes a server computer and at least one client, whereby a lesson builder allows teachers to create customized lessons incorporating text, audio, images, video and application programs for delivery to the student user. The system is typically accessed by teachers and students via an Internet browser which receives web pages served from the server computer, which communicates with the client computer via an intranet or the Internet. U.S. Pat. No. 6,009,397, which issued to Siegel on Dec. 28, 1999 for a "Phonic Engine" discloses a method which allows a user to specify phenomes and the relative positions of phenomes with respect to a word or group of words, such as a title. U.S. Pat. No. 6,148,286, which issued to Siegel on Nov. 14, 2000 for a "Method and Apparatus for Database Search With Spoken Output, For User With Limited Language Skills" discloses a method and apparatus which allows a user with minimal understanding of the orthography of a language to nevertheless use its orthography as the basis for performing a database search.

Such systems and devices, however, fail to offer the unique advantages contemplated by the present invention.

SUMMARY OF THE INVENTION

Against the foregoing background, it is a primary object of the present invention to provide a system and method that allows individuals to write an essay, short story, letter or poem employing a given set of active and descriptive words relating to a common picture.

It is another object of the present invention to provide such a system and method that can be access on a global computer network.

It is yet another object of the present invention to provide such a system and method that is easy to use.

It is still another object of the present invention to provide such a system and method that encourages an individual's imagination by requiring them to create a story based upon a limited number of key terms.

It is another object of the present invention to provide such a system and method that acts as an tool to assist in developing creative writing skills.

It is still yet another object of the present invention to provide such a system and method that allows the creative writing stories generated thereby to be easily transmitted to others.

It is but another object of the present invention to provide such a system and method that easily allows for the comparison of creative writing stories of numerous individuals based on the same picture and set of words.

It is another object of the present invention to provide such a system and method that is both educational and entertaining to utilize.

It is still another object of the present invention to provide such a system and method that teaches individuals commonly-used parts of speech and phrases, such as articles, verbs, prepositions, and conjunctives.

To the accomplishments of the foregoing objects and advantages, the present invention, in brief summary, comprises a system and method for generating an interactive story that prompts an individual with a image or photograph and provides a set of active and descriptive words relating to the picture, as well as a set of pre-determined, commonly-used parts of speech and phrases, including articles, verbs, prepositions, and conjunctives. The user is instructed to write an essay, short story, letter or poem online employing only said given set of active and descriptive words relating to the common picture. The length of the completed textual work is limited by the number of lines provided by the administrator. The completed textual work may then be submitted to a contest or posted for others to read and critique.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIGS. 3 through 10 are screen printouts of the various functions of the system and method of FIG. 1.

BRIEF DESCRIPTION OF THE PREFERRED EMBODIMENTS

Figure 1:
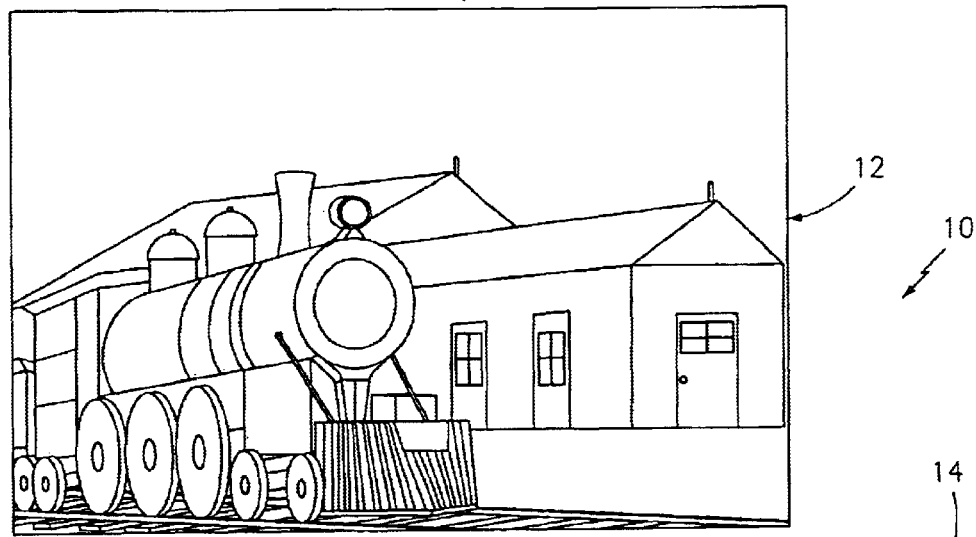
FIG. 1 is an illustration of the system and method of the present invention.
Figure 2:
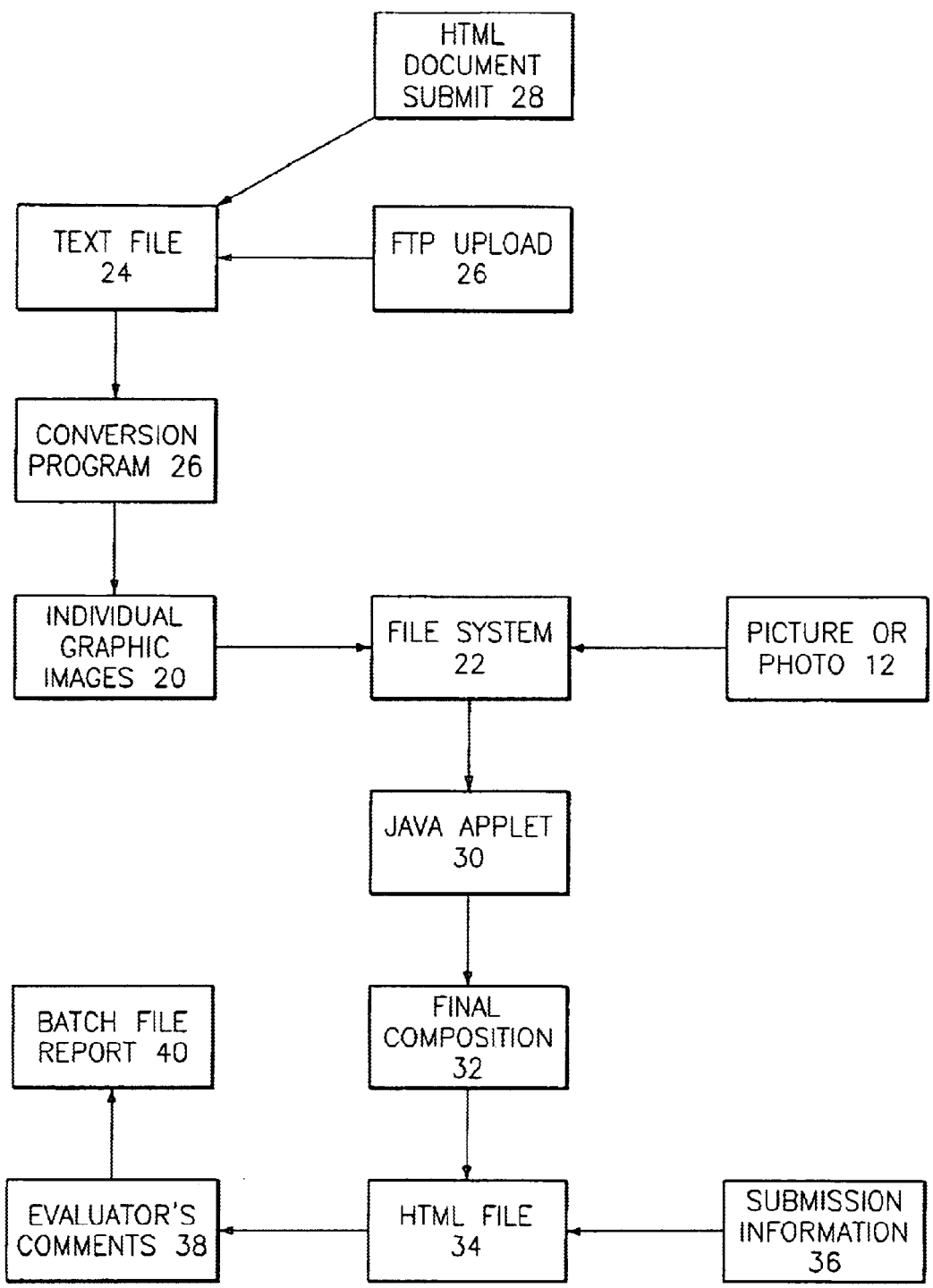
FIG. 2 is a flow-chart illustrating the system and method of FIG. 1.

Referring to the drawings and, in particular, to FIG. 1, the system for generating an interactive story of the present invention is provided and is referred to generally by reference numeral 10. The system 10 includes a means for providing image or photograph 12 which, when image or photograph 12 serves as the inspiration for the story. In addition to providing the image or photograph 12, the system also presents a table of active and descriptive words 14 relating to said image or photograph 12. Said active and descriptive words 14 are further designed to act as an incentive and to stimulate the imagination of the individual utilizing the system 10. The individual utilizing the system 10 must use the active and descriptive words 14 in writing the story based upon the image or photograph 12.

Finally, the system 10 sets forth a set of predetermined, commonly-used parts of speech and phrases 16, including articles such as "the" and "a", common verbs and nouns, prepositions such as "over" and "through", and conjunctives such as "and" and "not". The individual utilizing the system 10 is limited to the active and descriptive words 14 and the commonly-used parts of speech and phrases 16 in generating the story. The system includes means to prevent unavailable words 18 from being used in generating the story.

In the preferred embodiment, the generating an interactive story 10 is provided on a global computer network such as the Internet. A user may access a web site upon which the system 10 is provided, and thereafter create a story using the active and descriptive words 14 and the commonly-used parts of speech and phrases 16. The benefit of having such a system 10 available online is that it allows multiple users to access the system 10 and generate stories inspired by the same image or photograph 12 and using the same active and descriptive words 14 and the commonly-used parts of speech and phrases 16. Furthermore, such an online system 10 allows the operator of the web site featuring the system 10 to have multiple systems 10 running simultaneously, using different pictures or photographs 12 and active and descriptive words 14 relating thereto. The commonly-used parts of speech and phrases 16 may be used by each system 10, since they are designed to remain constant.

Stories based upon the same image or photograph 12 may then be submitted to others online or otherwise, and may even be made part of a contest or game. For example, the stories may be submitted to a teacher for grading or evaluation, and the teacher may then respond with instructions on how to improve the individual's writing. Given that individuals are limited by the same active and descriptive words 14 and commonly-used parts of speech and phrases 16, the creativity of each entry may better be determined.

In the preferred method of the present invention, the image or photograph 12 as well as the descriptive words 14 and the commonly used parts of speech and phrases 16 are delivered to the user in order to inspire the composition of their story through the importation of individual graphic images 20 in a file system 22. A comma delimited text file 24 is created for the lists of descriptive words 14 and the commonly used parts of speech and phrases 16. The generation of this text file 24 could be through a basic ftp upload from another server 26 or, alternatively, could be entered from an html document 28 that would be submitted to the file system of the website. The image or photograph 12 is uploaded in a similar ftp or html file upload fashion. The text file 24 is run through a conversion program 26 in order to convert the text 24 into the individual graphical images 20 for each word. These images 20, including the photograph or image 12 that is being used as the subject of the prose or poetry, would then be imported into a Java applet 30 upon launching the application.

The individual graphic images 20 that represent the descriptive words 14 and the commonly used parts of speech and phrases 16 are moveable within the application to compose the prose as already indicated. In the preferred embodiment, the actual movement of the graphical images 20 is accomplished through the use of a commercially available graphics package, such as Macromedia Director, although other software options are contemplated. Once the user has completed the composition of the prose or poetry based upon or inspired by the image or photograph 12 using the descriptive words 14 and the commonly used parts of speech and phrases 16, the final composition 32 is saved and exported as an image file 32 through a screen capture generated when the user indicates the session is complete.

Once completed, the final compositions 32 are collected and sorted using an Internet browser such as, for example, Microsoft's Internet Explorer or Netscape Navigator. Each individual final composition 32 is placed into an individual html file 34, which file 34 is also coded with submission information 36 such as the author's identity, such as age and type of composition, as well as a date and time stamp. The web site administrator may then log into a secure site and select the final compositions 32 based upon certain criteria, such as date range, age range, or composition type. Each individual html file 34 could be viewed in this manner. After reviewing the html file 34, the evaluator would append to the file evaluator's comments 38, which comments could include, for example, a rating, e.g. on the scale of one to ten or grades from A to F, instructions on how to improve the writing, etc. The evaluator may submit these evaluator's comments 38 to the author of the work. A batch report 40 would then be generated, which report would compile the html files 34 (along with the evaluator's comments 38 relating thereto), and export them into any kind of text file format for alternative viewing.

In the preferred embodiment, the administrator of the web site featuring the system and method of the present invention would be able to perform administrative duties from any personal computer connected to the network upon which the system is running. These administrative functions may be conducted through a commercially available Internet browser of the type already discussed. In order to access these administrative functions, the administrator need only direct the browser to an appropriate URL and supply a unique user name and password when presented with the login dialog box of the type shown in FIG. 3.

Once the administrator has logged onto the system, he or she can set or update a variety of functions, including the contest parameters, as illustrated in FIG. 4. The contest parameters establish a variety of contest variables, including the frequency of the contests, the start date and time of the contests, the time and date at which the winner's page will be updated, the number of entries per e-mail address.

Figures 5, 6:

In order to set up a particular competition, the administrator accesses the file upload function of the system of the present invention, as shown in FIG. 5. In such function, the administrator chooses the image or images 12 for each contest, as well as selecting the comma-delimited text file 24 that will be converted into the individual graphic images 20 suitable for movement on the monitor. The image may be resized and formatted into a file type suitable for display, such as bitmap image or JPEG image. The administrator may utilize the file upload function to upload either an individual competition or a month's worth of files for competitions.

The collection of the individual HTML file entries 34 is shown in FIG. 6, in which the administrator may select entries and place them into suitable format for evaluation based upon certain qualifications. Illustrated in FIG. 6 is the collection of entries submitted during a particular date range.

Figure 7:

Viewing and judgment of particular HTML file entries 34 is made by an administrator or an evaluator utilizing the view entry feature, as illustrated in FIG. 7. The evaluator can read the particular file entry 34 and use this feature to evaluate and provide feedback to the author. Evaluations include, for example, the selection of the particular entry 34 as a finalist or a runner up, or the elimination of non-responsive entries 34.

In order to facilitate the sorting and processing of individual HTML file entries 34, the administrator may create a batch file report 40 utilizing the entry report feature, as shown in FIG. 8. The file report 40 includes all HTML file entries 34 for a particular competition, and may include additional information, such as the name and e-mail address of the author, and any notes or comments 38 appended by the evaluator. Using the entry report feature, the administrator can view or delete particular entries 34, or sort the entries 34 by various criteria.

Figure 9:

Once the administrator or evaluators have chosen a winner for a particular competition, the winner's entry may be posted on a "winner page" of the web site, as shown in FIG. 9. This page may include information about the author, as well as comments generated by the administrator or evaluator.

Finally, FIG. 10 illustrates the site maintenance functionality of the system of the present invention, in which the administrator may archive and/or remove expired competitions or entries so as to keep the web site running optimally. Using the archiving process, the administrator can compress the files into a format that will allow for viewing at a later date, such as, for example, a ZIP file.

Having thus described the invention with particular reference to the preferred forms thereof, it will be obvious that various changes and modifications can be made therein without departing from the spirit and scope of the present invention as defined by the appended claims.

I claim:

1. A system for generating an interactive story comprising:
   means for generating a graphic image;
   means for generating active and descriptive terms relating to said graphic image;
   means for generating a set of commonly used terms; and
   means to incorporate said active and descriptive terms and said commonly used terms into a story relating to said graphic image.

2. The system of claim 1, wherein said means for generating and means for incorporating are provided on a global computer network.

3. The system of claim 2, further including means for evaluating and judging said prose or poetry.

4. A system for allowing users to generate interactive prose or poetry on a computer network, said system comprising:
   an electronic database of at least one graphic picture;
   an electronic database of active and descriptive terms relating to said at least one graphic picture;
   means for converting said active and descriptive terms into manipulative graphic images;
   an online application for displaying said at least one graphic picture and said manipulative graphic images corresponding to said active and descriptive terms relating to said at least one graphic picture, said application including means to manipulate said graphic images into phrases and sentences in order to create said prose or poetry; and
   electronic means for collecting and viewing said prose or poetry.

5. A method for allowing users to generate interactive prose or poetry on a computer network, said method comprising:
   providing a graphic image;
   providing active and descriptive terms relating to said graphic image;
   providing a set of commonly used terms; and
   incorporating said active and descriptive terms and said commonly used terms into a story relating to said graphic image.

6. The method of claim 5, further including the step of evaluating said story and providing instruction on how to improve said story.

7. The method of claim 5, further including the step of delivering said story to one or more recipients.

8. The method of claim 5, further including the step of collecting two or more of said stories, comparing said stories based on creativity and language use, and providing an evaluation of said stories.

9. A method for allowing users to generate interactive prose or poetry on a computer network, said method comprising the steps of:

provinding an online application for generating at least one graphic picture, active and descriptive terms relating to said graphic picture and a set of commonly used terms;

converting said active and descriptive terms and said commonly-used terms into manipulative graphic images; and manipulating said manipulative graphic images utilizing said online application into phrases and sentences in order to create said prose or poetry relating to said graphic picture.

10. The method of claim 9, further including the step of collecting and sorting said prose or poetry.

11. The method of claim 10, further including the step evaluating and judging said prose or poetry.

12. The method of claim 9, wherein said step of generating said graphic picture and said terms relating to said graphic picture comprises the step of submitting a hyper-text markup language document containing said picture and said terms.

13. The method of claim 9, wherein said step of generating said graphic picture and said terms relating to said graphic picture comprises the step of uploading an electronic document containing said picture and said terms using file transfer protocol.

14. The method of claim 9, further including the step of providing an online administrative feature for indexing, sorting, displaying, archiving and deleting said prose or poetry.

* * * * *